(12) United States Patent
Van Vechten et al.

(10) Patent No.: US 12,236,072 B2
(45) Date of Patent: Feb. 25, 2025

(54) DISPLAYING ON A DISPLAY WITH AN IRREGULAR FEATURE

(71) Applicant: Apple Inc., Cupertino, CA (US)

(72) Inventors: Kevin J. Van Vechten, Montecito, CA (US); Chad E. Jones, San Jose, CA (US); Jesse E. Donaldson, Mountain View, CA (US); Kristin M. Forster, Los Altos Hills, CA (US); Mark P. Hamlin, Portland, OR (US); Ryan N. Armstrong, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/943,070

(22) Filed: Sep. 12, 2022

(65) Prior Publication Data

US 2023/0082764 A1    Mar. 16, 2023

Related U.S. Application Data

(60) Provisional application No. 63/243,689, filed on Sep. 13, 2021.

(51) Int. Cl.
*G06F 3/04845* (2022.01)
*G09G 3/20* (2006.01)

(52) U.S. Cl.
CPC ....... *G06F 3/04845* (2013.01); *G09G 3/2096* (2013.01); *G09G 2340/045* (2013.01); *G09G 2340/0464* (2013.01); *G09G 2354/00* (2013.01)

(58) Field of Classification Search
CPC . G06F 3/04845; G06F 3/0484; G09G 3/2096; G09G 3/2092; G09G 2340/045;
(Continued)

(56) References Cited

U.S. PATENT DOCUMENTS 5,298,890 A * 3/1994 Kanamaru .......... G06F 3/04812
345/157
9,959,027 B1   5/2018 Gajulapally et al.
(Continued)

FOREIGN PATENT DOCUMENTS

GB          2552090          1/2018

OTHER PUBLICATIONS

Zhang et al., "Geometric Correction for Projection Image Based on Azure Kinect Depth Data", 2020 International Conference on Virtual Reality and Visualization, pp. 196-199, published on Nov. 1, 2020. (Year: 2020).*

(Continued)

*Primary Examiner* — Hwei-Min Lu
(74) *Attorney, Agent, or Firm* — BAKERHOSTETLER (57) ABSTRACT

The subject technology provides for displaying applications on a display while avoiding the display's irregular or undesirable features. The disclosed techniques include determining whether a triggering condition related to an application executing on an electronic device is present, and if so, determining a user interface (UI) adjustment value. The UI adjustment value is applied to a frame that represents all of the content including a user interface of the application to be rendered on the display. The UI adjustment value represents an adjustment to the frame such that, when the adjusted frame is rendered, the user interface of the application is presented on the display except on a predefined portion (e.g., a portion including an irregular feature or region) of the display. The adjusted frame is then rendered to present the user interface of the application on the display except on the predefined portion of the display.

21 Claims, 7 Drawing Sheets

(58) Field of Classification Search
CPC ....... G09G 2340/0464; G09G 2340/04; G09G 2354/00
USPC .......................................................... 715/700
See application file for complete search history.

(56) References Cited

U.S. PATENT DOCUMENTS

| | | | | |
|---|---|---|---|---|
| 10,401,959 | B1* | 9/2019 | Fujii | G06F 3/0481 |
| 2013/0050224 | A1* | 2/2013 | Gehani | G06T 13/80 |
| | | | | 345/473 |
| 2013/0093764 | A1* | 4/2013 | Andersson | G06T 13/80 |
| | | | | 345/592 |
| 2013/0162575 | A1* | 6/2013 | Kaigawa | H04N 1/00411 |
| | | | | 345/173 |
| 2014/0298224 | A1* | 10/2014 | Arita | G06F 3/0484 |
| | | | | 715/765 |
| 2018/0219987 | A1* | 8/2018 | Pantel | H10K 59/40 |
| 2018/0307270 | A1* | 10/2018 | Pantel | G06F 1/1637 |
| 2019/0004687 | A1* | 1/2019 | Gajulapally | G06F 1/1686 |
| 2019/0056854 | A1* | 2/2019 | Azzolin | G06F 3/04886 |
| 2019/0107943 | A1* | 4/2019 | Daioku | G06F 3/0482 |
| 2019/0371010 | A1* | 12/2019 | Fox | G09G 5/36 |
| 2019/0371263 | A1 | 12/2019 | Fox et al. | |
| 2020/0409545 | A1* | 12/2020 | Wang | G06F 3/04883 |
| 2021/0043136 | A1* | 2/2021 | Wang | G09G 3/2007 |

OTHER PUBLICATIONS

Extended European Search Report from European Patent Application No. 22195373.0, dated Jan. 30, 2023, 13 pages.
European Office Action from European Patent Application No. 22195373.0, dated Nov. 16, 2023, 17 pages.
European Office Action from European Patent Application No. 22195373.0, dated May 6, 2024, 12 pages.
Korean Office Action from Korean Patent Application No. 10-2022-0114968, dated Jul. 8, 2024, 12 pages including English language translation.

* cited by examiner

DISPLAYING ON A DISPLAY WITH AN IRREGULAR FEATURE

CROSS REFERENCE TO RELATED APPLICATIONS

This application claims the benefit of priority to U.S. Provisional Patent Application No. 63/243,689, filed on Sep. 13, 2021, the disclosure of which is hereby incorporated herein in its entirety.

TECHNICAL FIELD

The present description relates generally to displaying on a display with an irregular feature and, more particularly, for example, to displaying of an application user interface on a display with an irregular feature or shape.

BACKGROUND

Displays of electronic devices (e.g., a laptop computer, a desktop computer, a smartphone, etc.) generally have a regular rectangular shape. However, some electronic devices may have displays with an irregular feature (such as a notch, rounded edges).

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Some electronic devices may have displays with an irregular feature (such as a notch, rounded edges) and/or irregular/non-rectangular shapes or geometries (e.g., star or round-shaped). As an example, for a display having a two-dimensional array of pixels, a notch may be defined as a small area within the display area and adjacent to an edge (e.g., the top edge) of the display, the small area having no pixels but is surrounded with pixels. It may be visually or practically undesirable to render and present any part of an application user interface (UI) on a portion of the display that includes the irregular feature or shape as the application UI may be at least partially obscured by the irregular feature or shape. Typically, one or more applications installed on an electronic device (e.g., a laptop computer, a desktop computer, embedded computing system, etc.) may be developed and configured for a regular display with rectangular geometry. For example, an application may be configured under the assumption that a user interface of the application is to be rendered and presented on a generic rectangular display of which all pixels (in a two-dimensional array arrangement) are available for display purposes. However, when the user interface of such an application (e.g., an application window) is rendered and presented on a display having an irregular feature (e.g., a notch), a portion of the user interface may intersect with or get covered by the irregular feature and thus that user interface portion may be not visible to the user.

Such an obscured presentation of the application user interface may not only be visually displeasing to the user but may also conceal important application information (e.g., text or a status indicator) intended to be visually available to the user for proper user-application interaction. Moreover, once displayed, it may not be possible for the user to digitally move (e.g., using the click and drag operation of the mouse pointer) the user interface or the obscured portion thereof away from the display area covered by the irregular feature. For example, if the application user interface or window is first displayed in a full-screen mode such that the window covers the entire display, it would not be possible for a user to move the window to another display area without terminating the full-screen mode. As another example, an application may be programmed such that, upon execution, an element of its user interface (e.g., a toolbar or a status bar of the application) is static and always displayed in a specific region of the display (e.g., covering a few pixel rows near the top of a rectangular display screen). As such, when the user interface is presented on a display with an irregular feature (e.g., a notch) in the same region that includes the static user interface element, the static user interface element or a portion therefore may undesirably get covered by the irregular feature.

A user may attempt to avoid an irregular display feature by changing the display resolution, which is typically available as a display setting on conventional computing devices. However, any change in the resolution (or any other display setting) may cause flashing or other unwanted artifacts on the display, or may require the user to reboot the computing device to have the new display setting take effect. Accordingly, making such display setting changes for an application may be ineffective and impractical as it requires a manual (i.e., not automatic) intervention by the user and will result in a persistent state of the display (until the setting is changed again) that may not be ideal for other applications that are also displayed, albeit in the background, on the display. Further, with the advent of electronic displays having different shapes, sizes, aspect ratios, and non-rectangular features, it may not be feasible for application developers to create or update applications such that the corresponding user interfaces are compatible with (i.e., do not get obstructed by) the irregular or non-rectangular display geometries. Accordingly, it may be desirable to have techniques implemented in operating systems and electronics devices that automatically adjust the rendering and displaying of an application user interface such that the user interface does not intersect with the display's irregular feature.

The subject system provides techniques for displaying applications on a display while avoiding the display's irregular features (such as a notch, rounded edges) and/or accounting for the display's irregular/non-rectangular shapes (e.g., star or round-shaped), responsive to certain triggering condition(s) specifically related to the application being displayed. In other words, the subject techniques provide for displaying an application while avoiding the display's region(s) that either don't have pixels or have pixels that are not to be used for the application.

The disclosed techniques include determining whether a triggering condition related to an application executing on an electronic device is present, and if so, determining a user interface (UI) adjustment value. The UI adjustment value is applied to a frame that represents all of the content including a user interface of the application to be rendered on a display of the electronic device. The UI adjustment value represents an adjustment to the frame such that, when the adjusted frame is rendered, the user interface of the application is presented on the display except on a predefined portion (e.g., a portion including an irregular feature or region) of the display. The adjusted frame is then rendered to present the user interface of the application on the display except on the predefined portion of the display. Further, responsive to a determination that the triggering condition is no longer present, the UI adjustment value is no longer applied to the frame, and the (unadjusted) frame is rendered to present the user interface of the application on the display.

Figure 1:
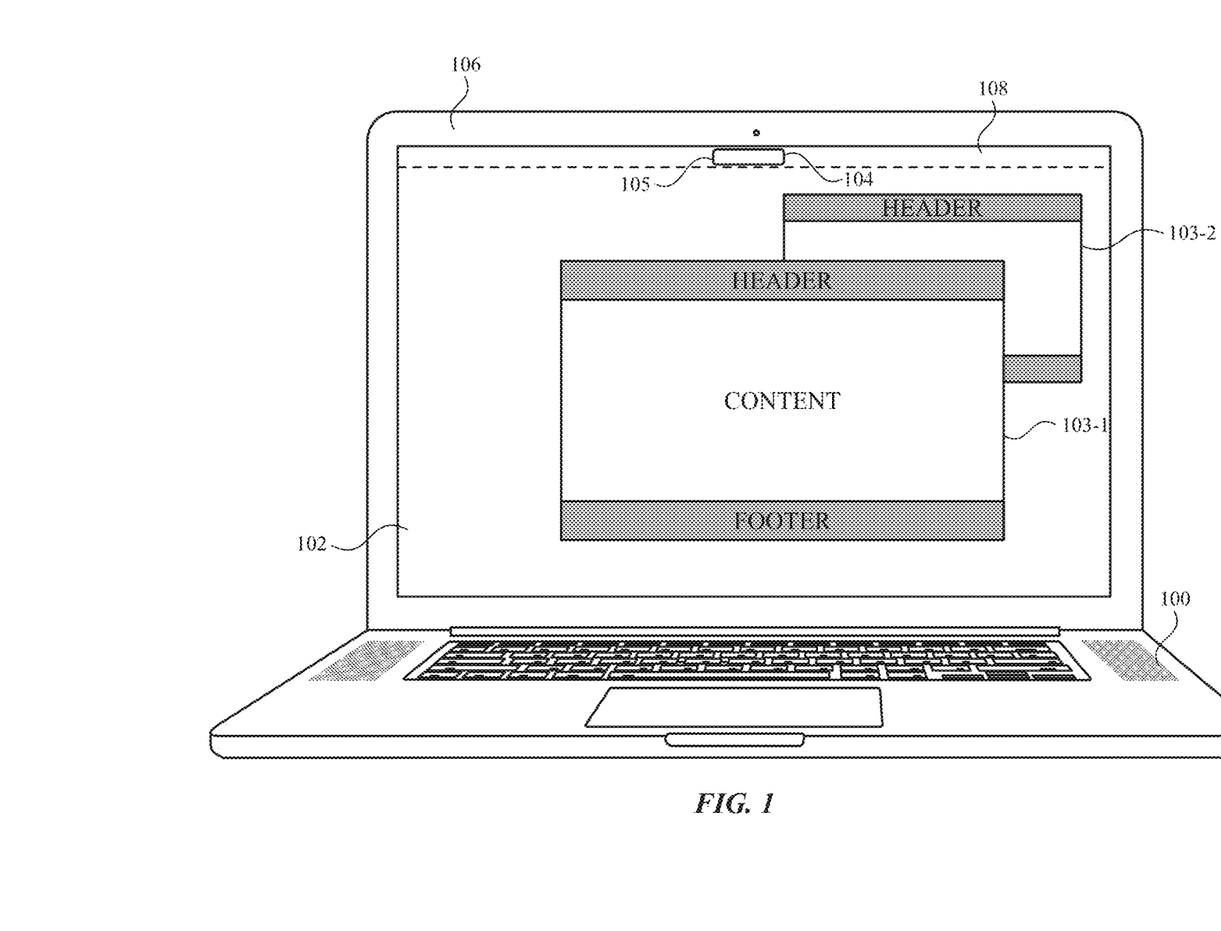
FIG. 1 illustrates an example electronic device that may implement techniques to automatically adjust the rendering and displaying of an application user interface in accordance with one or more implementations.

FIG. 1 illustrates an example electronic device 100 that may implement techniques to automatically adjust the rendering and displaying of an application user interface such that the user interface does not intersect with the display's irregular feature or shape. The electronic device 100 is depicted as a laptop computer; however, that depiction is not limiting. The electronic device 100 may be, for example, a desktop computer, a smartphone, a peripheral device (e.g., a digital camera, headphones), a tablet computing device, a wearable device (such as a watch, a band, and the like), an appliance (e.g., refrigerator), a vehicle, a robot, a kiosk, an accessory device, or any other appropriate device that includes or is operationally connected to, for example, a display with one or more irregular features (such as a notch, a keyhole, rounded edges) and/or has an irregular shape (e.g., star-shape, round-shape, or any other non-rectangular shape). The electronic device 100 may include one or more wireless interfaces, such as WLAN radios, cellular radios, Bluetooth® radios, Zigbee® radios, near field communication (NFC) radios, and/or other wireless radios. The electronic device 100 may be, and/or may include all or part of, the device discussed below with respect to FIG. 2, and/or the system discussed below with respect to FIG. 3.

By way of example, as shown in FIG. 1, the electronic device 100 includes a display 102 having an irregular feature 104 adjacent to a top edge 106 of the display 102. The display 102 may be a non-touch display (e.g., a screen including an array of pixels) for displaying images or visual content including user interfaces of applications, or a touchscreen (e.g., a screen including an array of pixels and a corresponding array of capacitive, resistive, or other touch sensor electrodes that receive touch-based input) that can be used for both receiving user inputs (e.g., via a stylus or user's finger(s)) and displaying for displaying images or visual content including user interfaces of applications. For example, as shown in FIG. 1, the display 102 may display one or more windows 103-1, 103-2 that represent user interfaces of one or more applications being executed on the electronic device 100. In this example, the window 103-1 may be considered to be in the foreground and the window 103-2 may be considered to be in the background of the display 102.

The display 102 is depicted as having a mostly rectangular shape; however, that depiction is not limiting. The display 102 may have an irregular shape, e.g., star shape, round shape, oval shape, or any other non-rectangular shape. In FIG. 1, the irregular feature 104 is depicted as a notch 105, which may be defined as a relatively small area within the display area of the display 102 and adjacent to an edge (e.g., the top edge 106) of the display 102, the small area having no pixels but is surrounded with pixels. Instead of being adjacent to the top edge 106, the notch 105 may be adjacent to a different edge (e.g., the bottom edge, the left edge, or the right edge) of the display 102. In some implementations, the display 102 may include more than one irregular feature 104 in different regions (e.g., along the same edge or different edges) of the display 102. In some implementations, in addition to or as an alternative to the notch 105, the irregular feature 104 may include one or more of a keyhole feature, a region of the display 102 adjoining and across an entire edge of the display, and a region of the display 102 underneath which an electronic component (e.g., a sensor, a camera, etc.) is embedded.

In some implementations, the subject techniques define a portion of the display (referred to herein as the "predefined portion of the display") around and including the display's irregular feature(s). As described in detail below, the subject techniques, when implemented, may result in adjusting the rendering of a user interface of an application such that the user interface is presented on the display except on the predefined portion of the display. By way of example, in FIG. 1, a region 108 across the top edge 106 and including the notch 105 defines the predefined portion of the display 102. However, that depiction is not intended to be limiting; the region 108 may span across multiple edges of the display 102. Further, although not shown, one or more static user interface elements (e.g., a toolbar, a status bar, etc.) of an operating system of the electronic device 100 may be displayed in the region 108 when the electronic device 100 is operational.

Figure 2:
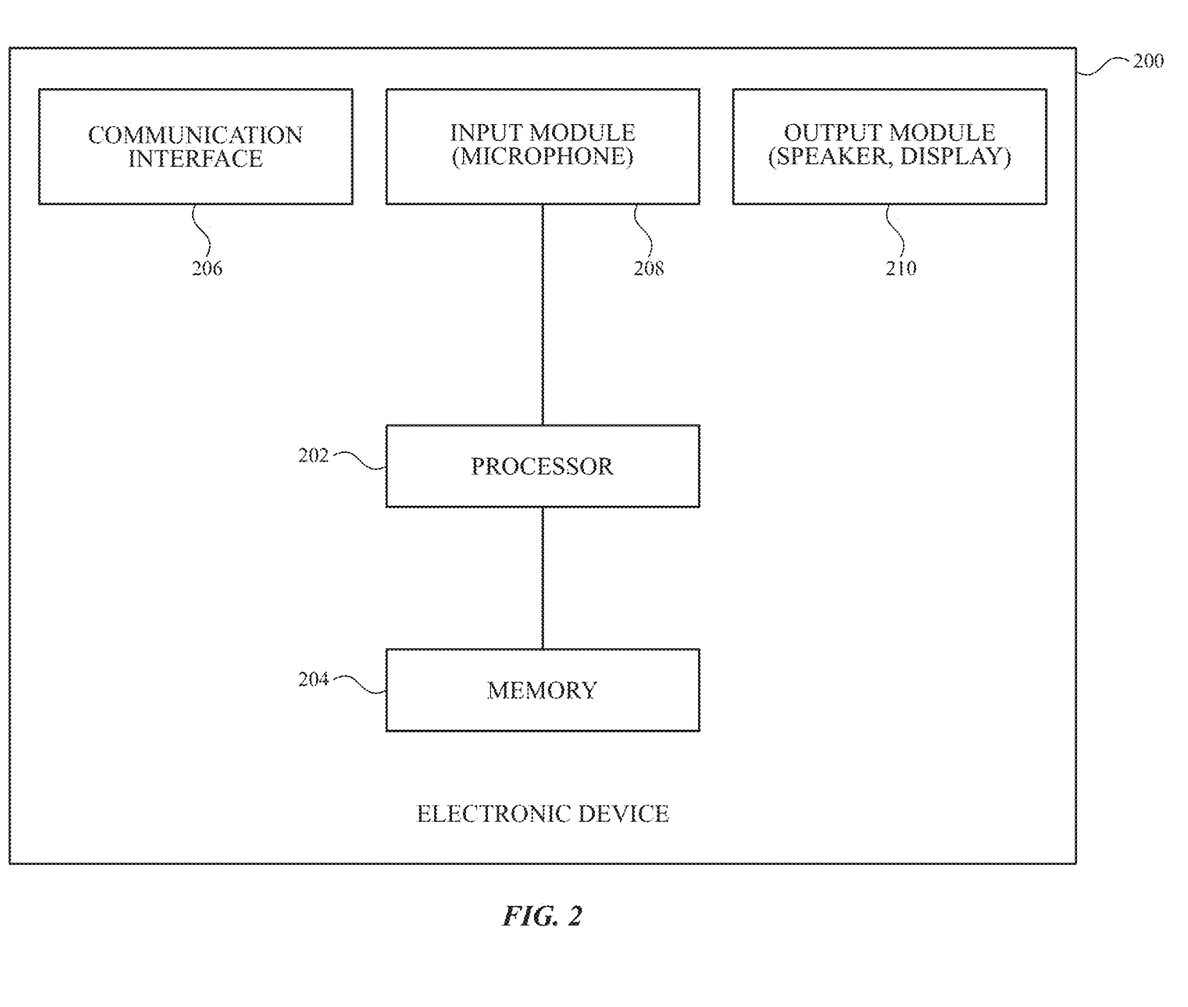
FIG. 2 illustrates an example electronic device that may be implemented in the subject system in accordance with one or more implementations.

FIG. 2 illustrates an example device 200 that may implement a system for the device depicted in FIG. 1 in accordance with one or more implementations. Not all of the depicted components may be used in all implementations, and one or more implementations may include additional or different components than those shown in the figure. Variations in the arrangement and type of the components may be made without departing from the spirit or scope of the claims as set forth herein. Additional components, different components, or fewer components may be provided.

The device 200 may include a processor 202, a memory 204, a communication interface 206, an input device or module 208, and an output device or module 210. The processor 202 may include suitable logic, circuitry, and/or code that enable processing data and/or controlling operations of the device 200. In this regard, the processor 202 may be enabled to provide control signals to various other components of the device 200. The processor 202 may also control transfers of data between various portions of the device 200. Additionally, the processor 202 may enable implementation of an operating system or otherwise execute code to manage operations of the device 200.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, in a case where the device 200 corresponds to one or more of the electronic device 100, the memory 204 may include a frame buffer for storing a frame that represents all the content including a user interface of the application to be rendered on the display 102 of the electronic device 100. In some implementations, the frame buffer may be a contiguous high throughput memory in which each element of the frame buffer corresponds to a single pixel on the display 102. The intensity of each pixel may be in accordance with a voltage value applied to the corresponding element of the frame buffer.

The input device 208 may include suitable logic, circuitry, and/or code for capturing input, such as audio input (e.g., voice requests), remote control input, touchscreen input, keyboard input, mouse input, etc. The output device 210 may include suitable logic, circuitry, and/or code for providing output, such as audio output (e.g., music), image or video output (e.g., a digital image or video), etc. The output device 210 may include the display 102 including the irregular feature 104 as discussed above with respect to FIG. 1.

The communication interface 206 may include suitable logic, circuitry, and/or code that enables wired or wireless communication for the device. The communication interface 206 may include, for example, one or more of a Bluetooth® communication interface, a cellular (3G, 4G/LTE, 5G) interface, an NFC interface, a Zigbee® communication interface, a WLAN communication interface, a USB communication interface, or generally any communication interface.

In one or more implementations, one or more of the processor 202, the memory 204, the communication interface 206, the input device 208, the output module 210 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
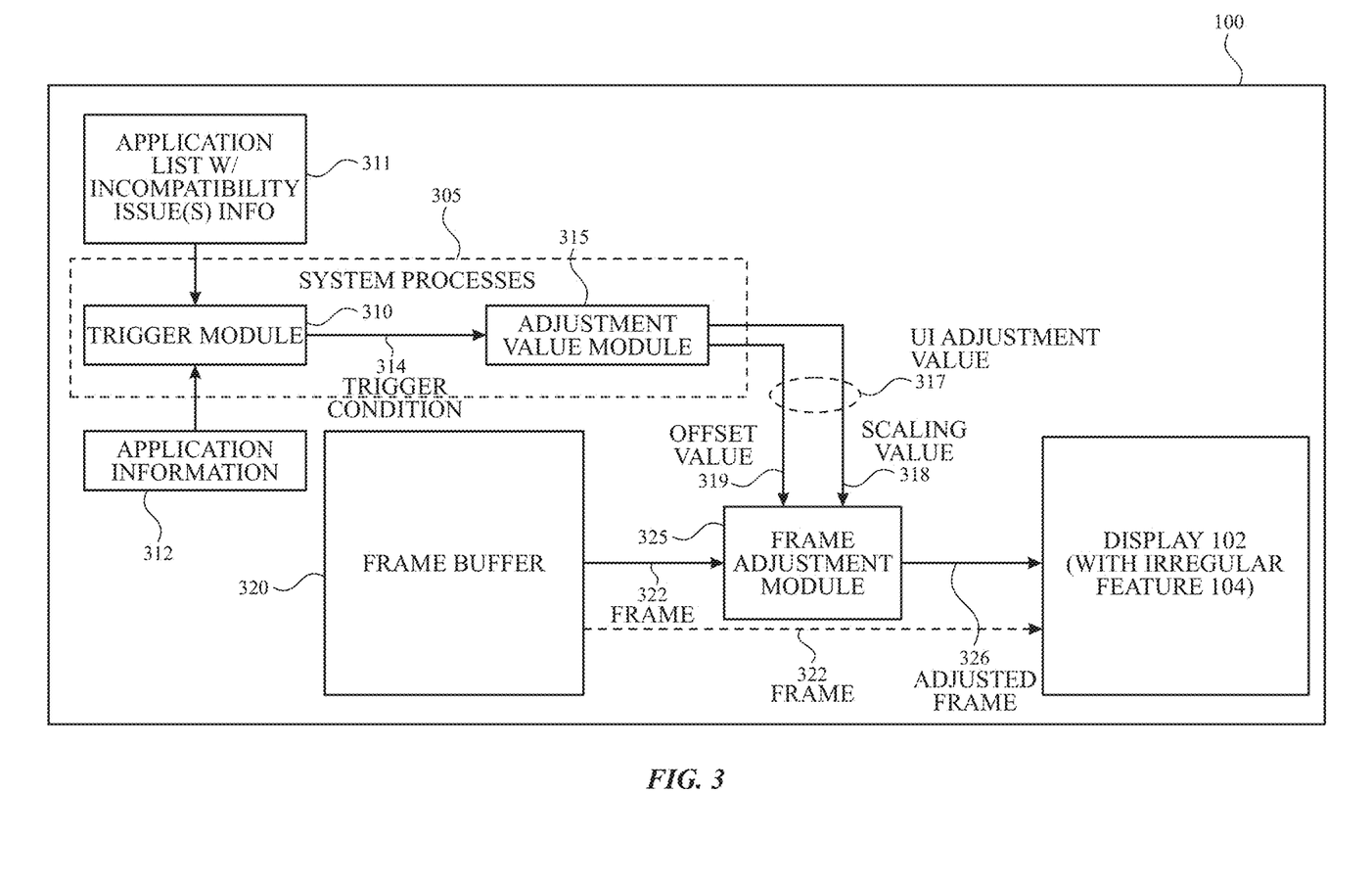
FIG. 3 illustrates an example system architecture that may be implemented by the electronic device 100 in accordance with one or more implementations of the subject technology.

FIG. 3 illustrates an example system architecture that may be implemented by the electronic device 100 in accordance with one or more implementations of the subject technology. For example, the system architecture may implement techniques to automatically adjust the rendering and displaying of an application user interface such that the user interface does not intersect with the display's irregular feature or shape. For explanatory purposes, the architecture of FIG. 3 is described as being implemented based on the depicted components of the electronic device 100, by using a processor and/or memory of the electronic device 100. However, not all of the depicted components may be used in all implementations, and one or more implementations may include additional or different components than those shown in the FIG. 3. Variations in the arrangement and type of the components may be made without departing from the spirit or scope of the claims as set forth herein. Additional components, different components, or fewer components may be provided.

Various portions of the architecture of FIG. 3 can be implemented in software or hardware, including by one or more processors and a memory device containing instructions, which when executed by the processor cause the processor to perform the operations described herein. In the example of FIG. 3, the electronic device 100 includes system processes 305 including a trigger module 310 and an adjustment value module 315, a frame buffer 320, a frame adjustment module 325, and the display 102 (discussed above with respect to FIG. 1).

In one or more implementations, the frame buffer 320 stores a frame 322 that represents all the content including a user interface of the application to be rendered on the display 102. In some implementations, the frame buffer 320 may be a contiguous high throughput memory in which each element of the frame 322 in the frame buffer 320 corresponds to a single pixel on the display 102. The intensity of each pixel may be in accordance with a voltage value applied to the corresponding element of the frame buffer 320. As such, the frame 322 may be two-dimensional array having element values corresponding to the two-dimensional pixel array of the display 102. In one or more implementations, every memory cell in the frame buffer 320 may correspond to a single pixel. In the case of an n-bit color display, each of these n bits may a separate bit plane (e.g. 24-bit color will have 24 bit planes). The binary values from each of the n bit planes may be loaded into corresponding positions in a register of a system memory. The resulting binary number is interpreted as an intensity level between 0 to $2^n-1$, and the intensity level is then converted into an analog voltage between 0 and the maximum voltage by a digital-to-analog converter, hence enabling $2^n$ intensity levels. An array of such voltage values (corresponding to the pixels of the display 102) form the frame 322 stored in the frame buffer 320.

In one or more implementations, one or more applications executable on the electronic device 100 may be configured with a user interface which, when rendered, by default would be presented on the display 102 such that the user interface is at least partially obstructed by the irregular feature 104. For such applications, the operating system or the system processes 305 (separate from the applications) of the electronic device 100 may identify, create, store (in a memory of the device 100), and update a list of applications 311 along with their respective user interfaces' incompatibility issues. For example, for each application in the list, the corresponding incompatibility issue(s) may indicate a state or a manner in which the user interface of the application, when rendered, would intersect with the irregular feature 104 of the display 102 (and thus, be considered incompatible with the display 102).

Figure 4A:
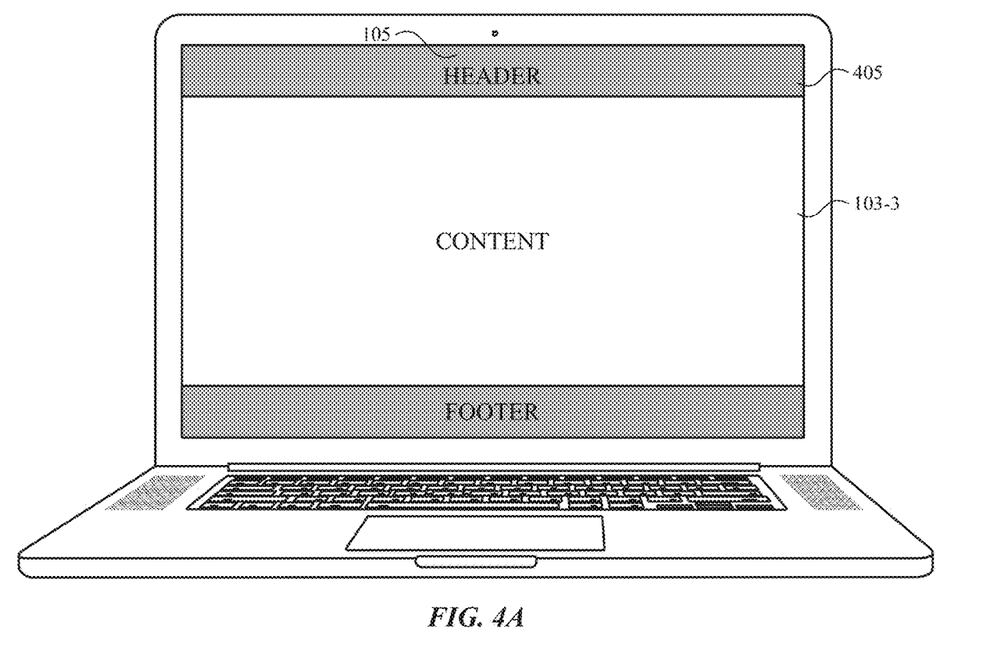
FIGS. 4A, 4B illustrate a use case of the subject technology in which adjustment of the user interface of an application having the full-screen incompatibility issue is implemented in accordance with one or more implementations of the subject technology.
Figure 5A:
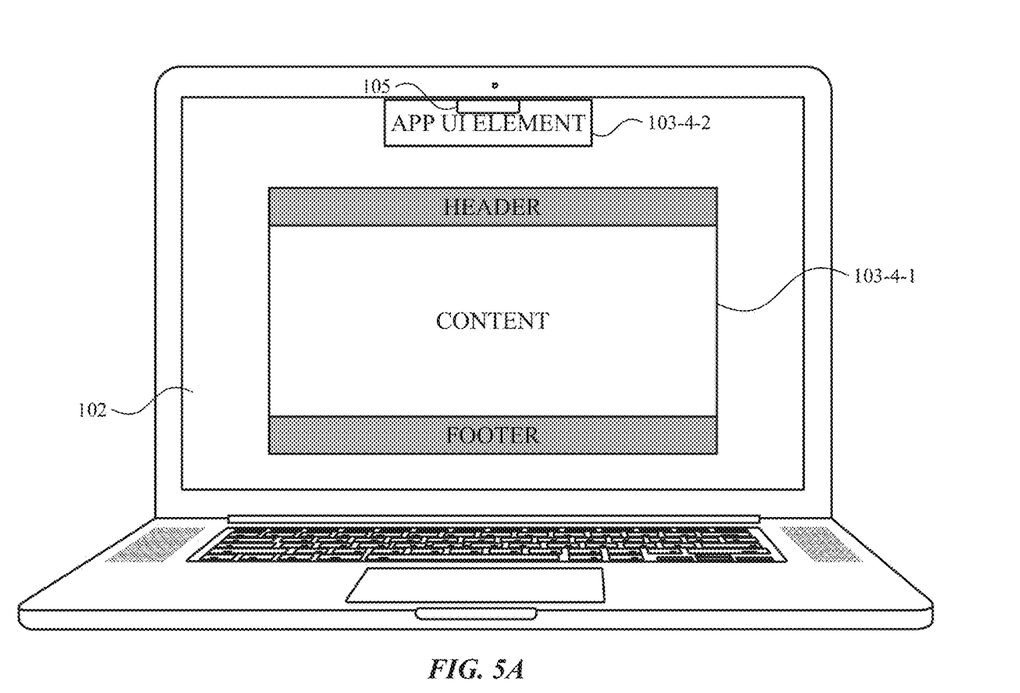
FIGS. 5A, 5B illustrate another use case of the subject technology in which adjustment of the user interface of an application having the UI element incompatibility issue is implemented in accordance with one or more implementations of the subject technology.

By way of example, the operating system may identify an Application 1 having a "full-screen" incompatibility issue in which when the user interface (e.g., a window 103-1 as shown in FIG. 4A) is rendered to be presented in the full-screen mode (covering the entire pixel array) on the display 102, a top portion of the user interface is obscured by the notch 105. As another example, an Application 2 on the electronic device 100 may be configured with a user interface that has two or more user interface (UI) elements (e.g., as shown in FIG. 5A), and one or more of the UI elements, when rendered, are static (i.e., cannot be moved based on user input) on the display 102 and are obscured by the notch 105. In this example, the operating system may identify the Application 2 as having a "UI element" incompatibility issue in which when the user interface is rendered to be presented on the display 102, the one or more static UI elements of Application 2 are obscured by the notch 105. Additionally, or alternatively, the operating system (or other system processes) executing on the electronic device 100 may identify and store other incompatibility issues indicating operational states or conditions of the applications in which at least portions of the corresponding user interfaces get covered or hidden on the display due to its irregular feature or shape.

In one or more implementations, the system processes 305 including the trigger module 310 and the adjustment value module 315 may receive and process application information 312 identifying an application which is currently "in focus," i.e., the application of which the user interface is to be rendered for displaying on the foreground of the display 102. The application information 312 (to be processed by the system processes 305) may also include state information of the application indicating a state of the user interface of the application. For example, the state information may indicate if the user interface is to be rendered and displayed in the full-screen mode on the display 102, or if the user interface includes a specific UI element which, when rendered, would have coordinates overlapping with the coordinates of the irregular feature 104 on the display 102.

In one or more implementations, the trigger module 310 may receive and process the application information 312 to determine whether a triggering condition is present such that the user interface of the in-focus application is to be adjusted to avoid being obscured by the irregular feature(s) of the display. For example, based on the application information 312, the trigger module 310 may determine (a) whether the identified in-focus application is one of the applications in the list of applications predetermined by the operating system as having incompatibility issue(s), and (b) whether the state information indicates a user-interface state that is identified in the list as an incompatibility issue (e.g., full-screen issue, UI issue, or due to movement of the user interface into the portion of the display that includes the irregular feature) for the in-focus application. In one or more implementations, a user may indicate that a given application may have incompatibility issues, such as by checking a box or selecting another UI element corresponding to the given application.

If the trigger module 310 determines that both the above (a) and (b) conditions are true (i.e., the user interface of the in-focus application would have an incompatibility issue if rendered), the trigger module 310 may determine that a trigger condition exists and generate a trigger condition signal 314. In one or more implementations, the trigger condition signal 314 may indicate activation of further modules and processes of the architecture to effectuate adjustment of the user interface so as to avoid or account for the irregular feature 104 when displayed on the display 102. In one or more implementations, the application information 312 may include an affirmative user input to the system processes specifying that the user requires the user interface of the in-focus application to be adjusted (e.g., to avoid or account for the irregular feature 104), regardless of whether either of the above-discussed conditions (a) and (b) is true. In this example, the trigger condition signal 314 represents an adjustment mode for the application activated based on the user input. In one or more implementations, the application information 312 may include a preference value embedded in the application (by the developer), the preference value indicating that the user interface of the application is to be adjusted (e.g., to avoid or account for the irregular feature 104), regardless of whether either of the above-discussed conditions (a) and (b) is true. In this example, the trigger condition signal 314 represents an adjustment mode for the application activated based on the embedded preference value. In some implementations, the operating system can identify triggering events or conditions without receiving any specific triggering instructions or data, thereby allowing the operating system to render adjusted frames for applications that have not been updated for use with the display 102. This allows existing applications to execute and display on new devices with new (non-rectangular) display geometries.

In one or more implementations, the adjustment value module 315 may receive and process the trigger condition signal 314 to determine a user interface (UI) adjustment value 317. For example, the UI adjustment value 317 may include a scaling value 318 and an offset value 319. The scaling value 318 may be used to scale values of a frame 322 from the frame buffer 320 to obtain an adjusted frame 326. Here, the adjusted frame 326 may represent the frame 322 that has been shrunk or expanded in terms of the display resolution (in both height and width) in accordance with the scaling value 318. The offset value 319 may be used to rectilinearly move values of a frame 322 from the frame buffer 320 to obtain an adjusted frame 326. Here, the adjusted frame 326 may represent the frame 322 that has been rectilinearly moved (in the horizontal and/or vertical direction) relative to the display 102's coordinates in accordance with the offset value 319. In one or more implementations, the UI adjustment of scaling and/or offsetting may be animated. Accordingly, the UI adjustment value 317 (one or both of the scaling value 318 and the offset value 319) may represent an adjustment to the frame 322 from the frame buffer 320 such that, when the adjusted frame 326 is rendered, the application's user interface is presented on the display 102 except on the predefined portion, e.g., the region 108 (including the irregular feature 104 or the notch 105) of the display 102.

In one or more implementations, the frame adjustment module 325 may receive and process the frame 322 and the UI adjustment value 317 including the scaling value 318 and/or the offset value 319 to generate an adjusted frame 326. As noted above, in accordance with the adjusted frame 326, the application's user interface is modified such that when presented, the user interface is displayed on the display 102 except on the predefined portion, e.g., the region 108 of the display 102, thus avoiding the irregular feature 104 or the notch 105 (e.g., as discussed below in reference to FIGS. 4A-4B and FIGS. 5A-5B). In one or more implementations, the frame adjustment module 325 may apply the scaling value 318 to scale the frame 322 to obtain an adjusted frame 326. For example, the frame adjustment module 325 may shrink (or expand) the size of the frame 322 in both height and width in accordance with the scaling value 318, such that the adjusted frame 326 when presented on the display 102 would have a lower resolution as compared to a presentation of the frame 322. By way of example, the scaling value 318 may represent a reduction in the size of the frame 322 to 99% or 98% or 97% of its original size, although these reduction values are not limiting. In one or more implementations, the frame adjustment module 325 may apply the offset value 319 to the frame 322 to obtain an adjusted frame 326. For example, the frame adjustment module 325 may rectilinearly move (in the horizontal and/or vertical direction) the frame 322 relative to the display 102's coordinates in accordance with the offset value 319, such that the adjusted frame 326 when presented on the display 102 would have a rectilinearly-displaced presentation as compared to a presentation of the frame 322. For example, when the adjusted frame 326 is rendered, the top edge of the application's user interface may be placed starting at a lower (vertical) coordinate position on the display 102 as compared to the placement of the same user interface on the display 102 if the (unadjusted) frame 322 were to be rendered.

In some implementations, the rendering of the adjusted frame 326 is performed by using a hardware module (e.g., processor, chipset, integrated circuit, etc.) that is constructed to perform the rendering in accordance with the UI adjustment value 317 without causing flashing or unwanted artifacts typically resulting from display setting changes on conventional computing systems. In some implementation, the applying of the UI adjustment value 317 to the frame 322 may change the appearance of all the content including the user interface of the in-focus application being displayed by the display 102. However, the change in the appearance would be effective until the triggering condition is present (as detected by the trigger module 310, discussed above). In some implementations, responsive to a determination by the trigger module 310 that the triggering condition is no longer present, the frame adjustment module 325 terminates application of the UI adjustment value 317 to the frame 322, and the frame 322 is rendered to display the user interface of the application on the display 102.

Figure 4B:
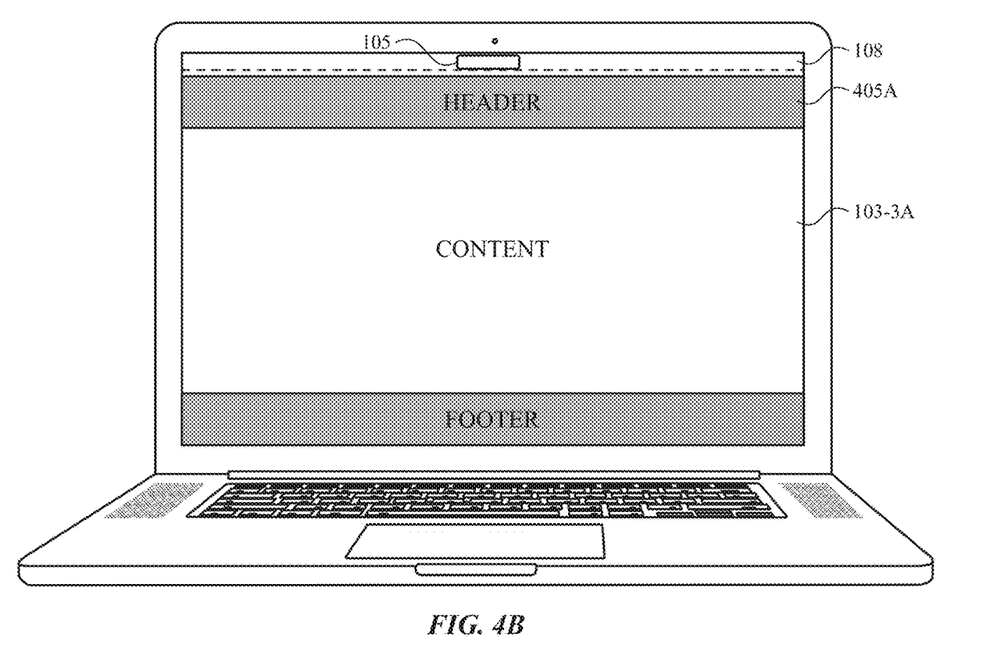

FIGS. 4A, 4B depict a use case of the subject technology in which adjustment of the user interface of an application having the full-screen incompatibility issue is illustrated. For example, as shown in FIG. 4A, a window 103-3 of an in-focus application is displayed in the full-screen mode on the display 102 of the electronic device 100. As shown, a portion of a header 405 of the window 103-3 intersects with and is thus obscured by the notch 105. In accordance with the techniques and the architecture discussed above with respect to FIG. 3, the trigger module 310 may determine that a triggering condition for the window 103-3 of the in-focus application is present. Based on the trigger condition signal 314, the adjustment value module 315 may determine a suitable UI adjustment value 317, and the frame adjustment module 325 may apply the UI adjustment value 317 to a frame 322 corresponding to content including the window 103-3 to obtain an adjusted frame 326. The frame 322 may represent content including the window 103-3 to be rendered on the display 102. The UI adjustment value 317 may represent an adjustment to the frame 322 such that, when the adjusted frame 326 is rendered, the window 103-3 is presented on the display 102 except on the predefined region 108 including the notch 105 of the display 102. As shown in FIG. 4B, the adjusted frame 326 is rendered and presented as an adjusted window 103-3A, which may be smaller than and/or downward displaced as compared to the window 103-3. The scaling and rectilinear movement adjustments to the window 103-3 may be based on the scaling value 318 and the offset value 319, respectively. In one or more implementations, the UI adjustment of scaling and/or offsetting may be animated. As shown, the top edge of a header 405A of the window 103-3A is displayed below the predefined region 108 thus avoiding the visual intersection of the window with the notch 105.

Figure 5B:
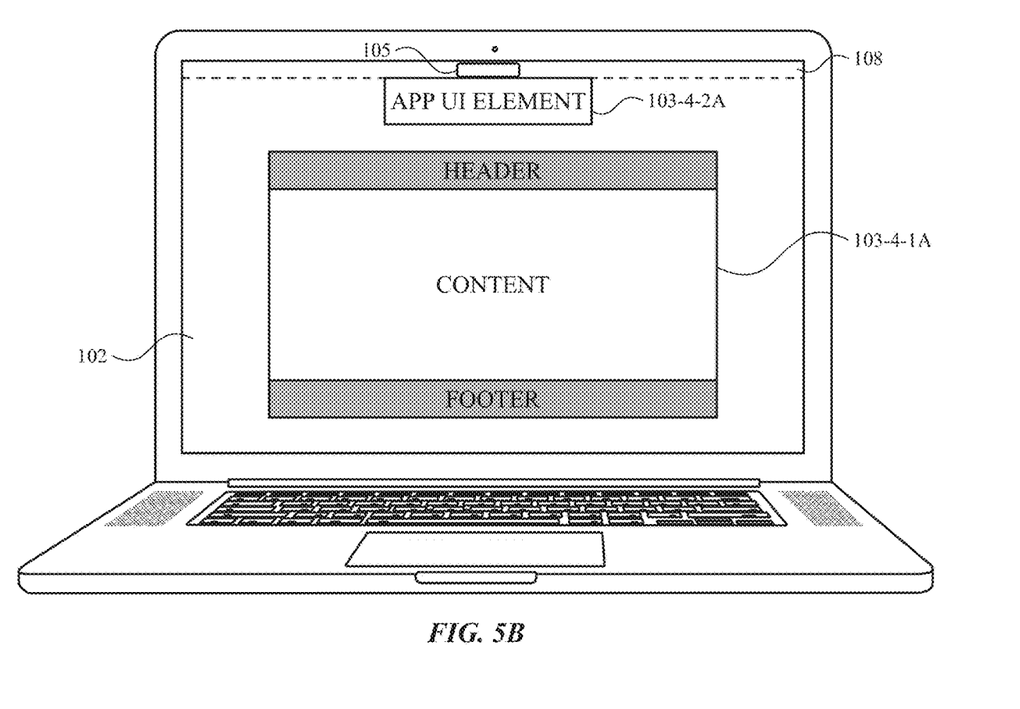

FIGS. 5A, 5B depict another use case of the subject technology in which adjustment of the user interface of an application having the UI element incompatibility issue is illustrated. For example, as shown in FIG. 5A, the user interface of an in-focus application may include a window 103-4-1 and a UI element 103-4-2, both of which are displayed on the display 102 of the electronic device 100. As shown, a portion of UI element 103-4-2 intersects with and is thus obscured by the notch 105. In accordance with the techniques and the architecture discussed above with respect to FIG. 3, the trigger module 310 may determine that a triggering condition in relation to the UI element 103-4-2 is present. Based on the trigger condition signal 314, the adjustment value module 315 may determine a suitable UI adjustment value 317, and the frame adjustment module 325 may apply the UI adjustment value 317 to a frame 322 corresponding to all the content on the display 102 including the UI element 103-4-2 to obtain an adjusted frame 326. The UI adjustment value 317 may represent an adjustment to the frame 322 such that, when the adjusted frame 326 is rendered, the UI element 103-4-2 is presented on the display 102 except on the predefined region 108 including the notch 105 of the display 102. As shown in FIG. 5B, the adjusted frame 326 is rendered and presented including an adjusted UI element 103-4-2A and an adjusted window 103-4-1A. The adjusted window 103-4-1A and the adjusted UI element 103-4-2A may be smaller than and/or downward displaced as compared to the window 103-4-1 and the UI element 103-4-2, respectively. The scaling and rectilinear movement adjustments to the window 103-4-1 and the UI element 103-4-2 may be based on the scaling value 318 and the offset value 319, respectively. As shown, the UI element 103-4-2 is displayed below the predefined region 108 thus avoiding the visual intersection of the UI element with the notch 105.

Figure 6:
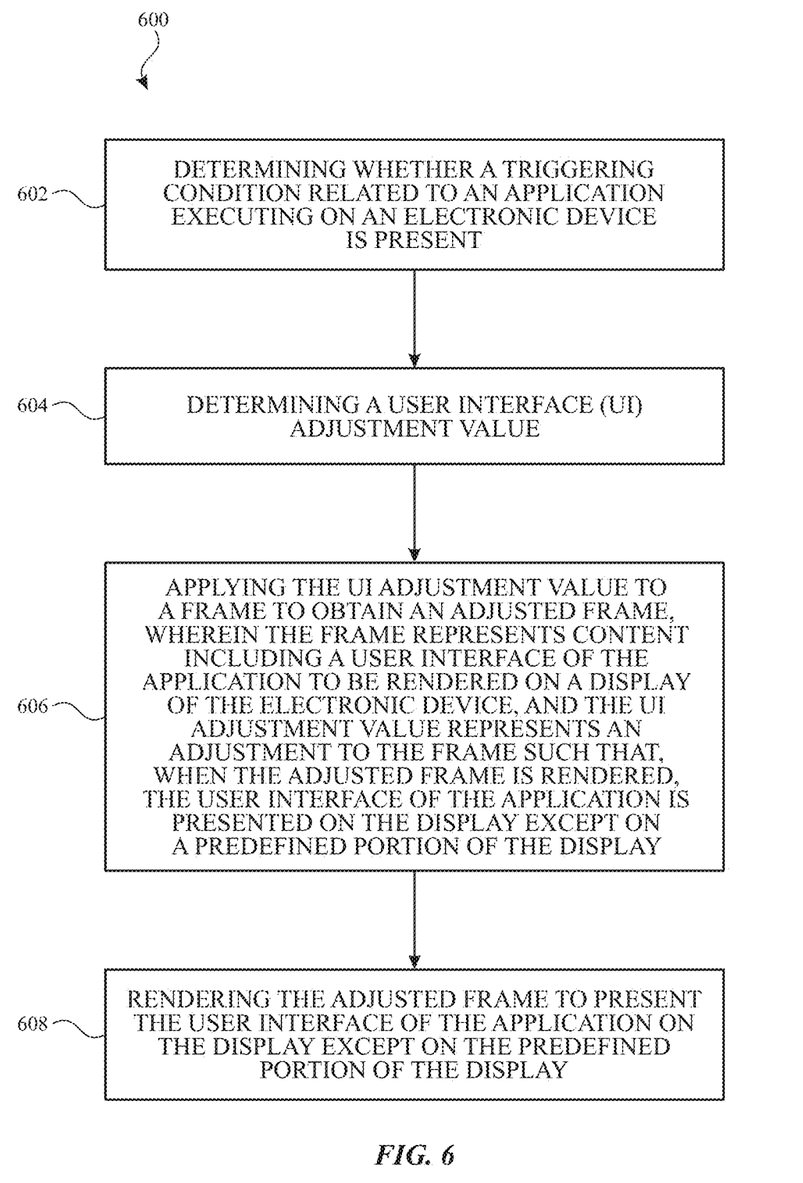
FIG. 6 illustrates a flow diagram of an example process implemented in accordance with one or more implementations of the subject technology

FIG. 6 illustrates a flow diagram of an example process for displaying applications on a display while avoiding or accounting for the display's irregular or undesirable features in accordance with one or more implementations. For illustrative purposes, the process 600 is primarily described herein with reference to the device 300 of FIG. 3. For illustrative purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

In operation 602, the process 600 includes determining, using, e.g., the trigger module 310, whether a triggering condition related to an in-focus application executing on an electronic device 100 is present.

In operation 604, the process 600 includes, responsive to a determination by the trigger module 310 that the triggering condition is present (as indicated by the trigger condition signal 314), determining, using the adjustment value module 315, a user interface (UI) adjustment value 317.

In operation 606, the process 600 includes applying, using the frame adjustment module 325, the UI adjustment value 317 to a frame 322 to obtain an adjusted frame 326. The frame 322 may represent content including a user interface of the application to be rendered on the display 102 of the electronic device 100. The UI adjustment value 317 may represent an adjustment to the frame 322 such that, when the adjusted frame 326 is rendered, the user interface of the application is presented on the display 102 except on a predefined portion (e.g., the region 108) of the display 102.

In operation 608, the process 600 includes rendering, using the processor, the adjusted frame 326 to present the user interface of the application on the display 102 except on the predefined portion (e.g., the region 108) of the display 102.

Some aspects of the present technology may involve gathering and use of data available from specific and legitimate sources for training and/or operating machine learning models. The present disclosure contemplates that in some instances, this gathered data may include personal information data that uniquely identifies or can be used to identify a specific person. Such personal information data can include voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for identifying a user of the device on which the disclosed techniques are being implemented and executed, or identifying a user profile in accordance with which the application (that is subject to the disclosed techniques) is being executed.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

Figure 7:
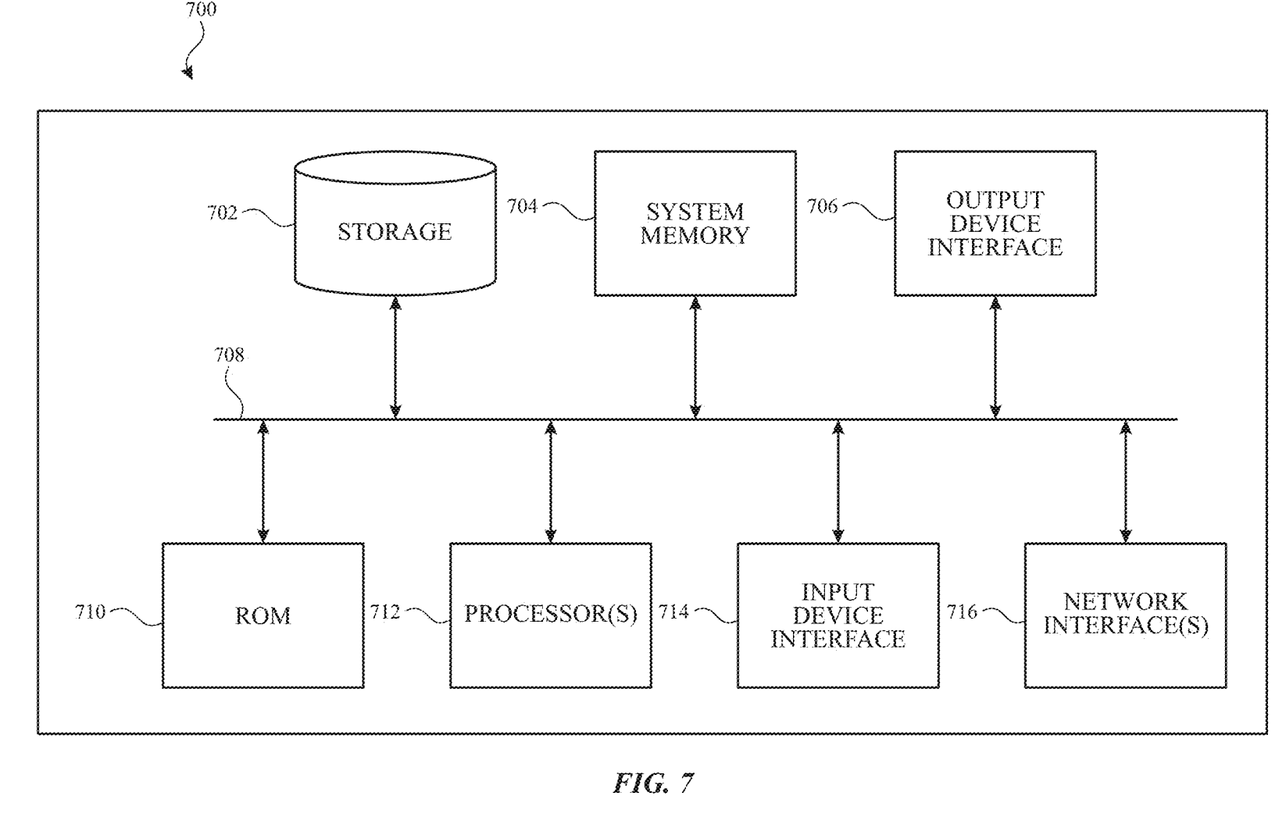
FIG. 7 illustrates an electronic system with which one or more implementations of the subject technology may be implemented.

FIG. 7 illustrates an electronic system 700 with which one or more implementations of the subject technology may be implemented. The electronic system 700 can be, and/or can be a part of the device 100, as shown in FIG. 1, or the devices illustrated in FIG. 2 and FIG. 3. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710 (which are each implemented as a non-transitory computer-readable medium). From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In accordance with aspects of the disclosure, a method is provided that includes determining whether a triggering condition related to an application executing on an electronic device is present, and if so, determining a user interface (UI) adjustment value. The UI adjustment value is applied to a frame that represents all of the content including a user interface of the application to be rendered on the display. The UI adjustment value represents an adjustment to the frame such that, when the adjusted frame is rendered, the user interface of the application is presented on the display except on a predefined portion (e.g., a portion including an irregular feature or region) of the display. The adjusted frame is then rendered to present the user interface of the application on the display except on the predefined portion of the display.

In accordance with aspects of the disclosure, a device is provided that includes at least one processor; and a memory including instructions that, when executed by the at least one processor, cause the at least one processor to determine whether a triggering condition related to an application executing on an electronic device is present, and if so, determine a user interface (UI) adjustment value. The instructions, when executed, further cause the at least one processor to apply the UI adjustment value to a frame that represents all of the content including a user interface of the application to be rendered on the display. The UI adjustment value represents an adjustment to the frame such that, when the adjusted frame is rendered, the user interface of the application is presented on the display except on a predefined portion (e.g., a portion including an irregular feature or region) of the display. The instructions, when executed, further cause the at least one processor to render the adjusted frame to present the user interface of the application on the display except on the predefined portion of the display.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A method, comprising:
   determining, using a processor, whether a triggering condition related to an application executing on an electronic device is present, wherein the triggering condition is determined when the application is in focus and when the application is determined to be included on a list indicating that a UI element of the application has a compatibility issue with a predefined portion of a display of the electronic device;
   responsive to a determination that the triggering condition is present, determining, using the processor, a user interface (UI) adjustment value, the UI adjustment value including an offset value;
   applying, using the processor, the UI adjustment value to a frame to obtain an adjusted frame, wherein the frame is rectilinearly moved in accordance with the offset value to obtain the adjusted frame, wherein the frame represents all content to be rendered on the display of the electronic device including a user interface of the application, and the UI adjustment value represents an adjustment to the frame such that, when the adjusted frame is rendered, the user interface of the application is presented on the display except on the predefined portion of the display; and
   rendering, using the processor, the adjusted frame to present the user interface of the application on the display except on the predefined portion of the display.

2. The method of claim 1, wherein the UI adjustment value includes a scaling value, wherein the frame is scaled in accordance with the scaling value to obtain the adjusted frame.

3. The method of claim 1, wherein the triggering condition includes movement of the user interface of the application into the predefined portion of the display or activation of a certain UI element of the user interface of the application which would intersect with the predefined portion of the display while the application is not in full-screen mode.

4. The method of claim 1, wherein the triggering condition includes a user input activating an adjustment mode for the application.

5. The method of claim 1, wherein the triggering condition includes a preference value embedded in the application, the preference value indicating activation of an adjustment mode for the application.

6. The method of claim 1, further comprising, responsive to a determination that the triggering condition is no longer present, terminating the application of the UI adjustment value to the frame; and rendering the frame to present the user interface of the application on the display.

7. The method of claim 1, wherein the predefined portion of the display includes one or more of a notch, a keyhole, an edge of the display and a display region underneath which an electronic component is embedded.

8. The method of claim 1, wherein the display has a non-rectangular shape.

9. The method of claim 1, further comprising: animating the application of the UI adjustment value.

10. The method of claim 1, wherein the triggering condition is further determined when a state of the application is determined to indicate that that the compatibility issue is activated.

11. A device, comprising:
    at least one processor; and
    a memory including instructions that, when executed by the at least one processor, cause the at least one processor to:
    determine whether a triggering condition related to an application executing on the device is present, wherein the triggering condition is determined when the application is in focus and when the application is determined to be included on a list indicating that a UI element of the application has a compatibility issue with a predefined portion of a display of the device;
    responsive to a determination that the triggering condition is present, determine a user interface (UI) adjustment value, the UI adjustment value including an offset value;
    apply the UI adjustment value to a frame to obtain an adjusted frame, wherein the frame is rectilinearly moved in accordance with the offset value to obtain the adjusted frame, wherein the frame represents all content to be rendered on the display of the device including a user interface of the application, and the UI adjustment value represents an adjustment to the frame such that, when the adjusted frame is rendered, the user interface of the application is presented on the display except on the predefined portion of the display; and
    render the adjusted frame to present the user interface of the application on the display except on the predefined portion of the display.

12. The device of claim 11, wherein the UI adjustment value includes a scaling value, wherein the frame is scaled in accordance with the scaling value to obtain the adjusted frame.

13. The device of claim 11, wherein the triggering condition includes movement of the user interface of the application into the predefined portion of the display or activation of a certain UI element of the user interface of the application which would intersect with the predefined portion of the display while the application is not in full-screen mode.

14. The device of claim 11, wherein the triggering condition includes a user input activating an adjustment mode for the application.

15. The device of claim 11, wherein the triggering condition includes a preference value embedded in the application, the preference value indicating activation of an adjustment mode for the application.

16. The device of claim 11, wherein the instructions, when executed by the at least one processor, further cause the at least one processor to: responsive to a determination that the triggering condition is no longer present, terminate the application of the UI adjustment value to the frame; and rendering the frame to present the user interface of the application on the display.

17. The device of claim 11, wherein the predefined portion of the display includes one or more of a notch, a keyhole, an edge of the display and a display region underneath which an electronic component is embedded.

18. The device of claim 11, wherein the display has a non-rectangular shape.

19. The device of claim 11, wherein the instructions, when executed by the at least one processor, further cause the at least one processor to: animate the application of the UI adjustment value.

20. A non-transitory computer-readable medium comprising instructions, which when executed by at least one computing device, cause the at least one computing device to perform operations comprising:
    determining whether a triggering condition related to an application executing on the at least one computing device is present, wherein the triggering condition is determined when the application is in focus and when the application is determined to be included on a list indicating that a UI element of the application has a compatibility issue with a predefined portion of a display of the at least one computing device;

responsive to a determination that the triggering condition is present, determining a user interface (UI) adjustment value, the UI adjustment value including an offset value;

applying the UI adjustment value to a frame to obtain an adjusted frame, wherein the frame is rectilinearly moved in accordance with the offset value to obtain the adjusted frame, wherein the frame represents all content to be rendered on the display of the at least one computing device including a user interface of the application, and the UI adjustment value represents an adjustment to the frame such that, when the adjusted frame is rendered, the user interface of the application is presented on the display except on the predefined portion of the display; and rendering the adjusted frame to present the user interface of the application on the display except on the predefined portion of the display.

21. The non-transitory computer-readable medium of claim 20, wherein the UI adjustment value includes a scaling value, wherein the frame is scaled in accordance with the scaling value to obtain the adjusted frame.

\* \* \* \* \*

UNITED STATES PATENT AND TRADEMARK OFFICE
CERTIFICATE OF CORRECTION

PATENT NO. : 12,236,072 B2
APPLICATION NO. : 17/943070
DATED : February 25, 2025
INVENTOR(S) : Kevin J. Van Vechten et al.

Page 1 of 1

It is certified that error appears in the above-identified patent and that said Letters Patent is hereby corrected as shown below:

In the Claims

Column 17; Line No. 61 (Claim 10): Replace "indicate that that the" with --indicate that the--.

Signed and Sealed this
Twenty-seventh Day of May, 2025

Coke Morgan Stewart
*Acting Director of the United States Patent and Trademark Office*